(12) United States Patent
Brewin et al.

(10) Patent No.: US 12,716,020 B2
(45) Date of Patent: Aug. 25, 2026

(54) FLEXIBLE COMPOSITE

(71) Applicant: Concrete Canvas Technology Ltd., Pontypridd (GB)

(72) Inventors: Peter Brewin, Pontypridd (GB); Christopher Evans, Pontypridd (GB); Marcin Kujawski, Pontypridd (GB); William Peake, Pontypridd (GB)

(73) Assignee: Concrete Canvas Technology Ltd., Pontypridd (GB)

( * ) Notice: Subject to any disclaimer, the term of this patent is extended or adjusted under 35 U.S.C. 154(b) by 778 days.

(21) Appl. No.: 17/420,008

(22) PCT Filed: Jan. 2, 2020

(86) PCT No.: PCT/EP2020/050046
§ 371 (c)(1),
(2) Date: Jun. 30, 2021

(87) PCT Pub. No.: WO2020/141203
PCT Pub. Date: Jul. 9, 2020

(65) Prior Publication Data

US 2022/0089934 A1 Mar. 24, 2022

(30) Foreign Application Priority Data

Jan. 3, 2019 (GB) ..................................... 1900077

(51) Int. Cl.
*C09K 8/473* (2006.01)
*C04B 14/30* (2006.01)
(Continued)

(52) U.S. Cl.
CPC ............ *C09K 8/473* (2013.01); *C04B 14/308* (2013.01); *C04B 14/368* (2013.01);
(Continued)

(58) Field of Classification Search
None
See application file for complete search history.

(56) References Cited

U.S. PATENT DOCUMENTS

2003/0144386 A1* 7/2003 Pakusch .............. C04B 40/0028
525/329.7
2010/0025049 A1 2/2010 Korte et al.
(Continued)

FOREIGN PATENT DOCUMENTS

CN 102301047 A 12/2011
EP 1368283 * 11/2006
(Continued)

OTHER PUBLICATIONS

Machine Translation of WO2009121888 (Year: 2009).*
(Continued)

*Primary Examiner* — Shawn Mckinnon
(74) *Attorney, Agent, or Firm* — Andrus Intellectual Property Law, LLP

(57) ABSTRACT

An expandable porous framework, the framework containing a dry cementitious powder fill that when exposed to an aqueous media, will expand against the constraint of the framework and set to form a solid, hard and coherent material, the formwork being porous to liquids but substantially impermeable to the powder fill.

29 Claims, 3 Drawing Sheets

(51) Int. Cl.

| | |
|---|---|
| ***C04B 14/36*** | (2006.01) |
| ***C04B 24/12*** | (2006.01) |
| ***C04B 24/26*** | (2006.01) |
| ***C04B 28/16*** | (2006.01) |
| ***C04B 38/10*** | (2006.01) |
| ***C04B 40/06*** | (2006.01) |
| ***C04B 103/00*** | (2006.01) |
| ***C04B 103/22*** | (2006.01) |
| ***C04B 111/00*** | (2006.01) |
| ***E21B 33/12*** | (2006.01) |

(52) U.S. Cl.

CPC ........ *C04B 24/123* (2013.01); *C04B 24/2641* (2013.01); *C04B 28/16* (2013.01); *C04B 38/10* (2013.01); *C04B 40/0625* (2013.01); *E21B 33/1208* (2013.01); *C04B 2103/0051* (2013.01); *C04B 2103/22* (2013.01); *C04B 2111/00706* (2013.01)

(56) References Cited

U.S. PATENT DOCUMENTS

| | | | | |
|---|---|---|---|---|
| 2013/0129946 | A1 | 5/2013 | Campbell et al. | |
| 2013/0161006 | A1 | 6/2013 | Robisson et al. | |
| 2013/0292117 | A1 | 11/2013 | Robisson et al. | |
| 2015/0246460 | A1* | 9/2015 | Schlusselbauer | B28B 17/0063 425/88 |
| 2017/0145288 | A1 | 5/2017 | Agapiou et al. | |
| 2017/0368713 | A1* | 12/2017 | Klooster | E04G 9/10 |

FOREIGN PATENT DOCUMENTS

| | | | |
|---|---|---|---|
| EP | 3415672 | | 12/2018 |
| JP | 2002004579 | * | 1/2002 |
| WO | WO2009121888 | * | 10/2009 |
| WO | WO2013076464 | * | 5/2013 |

OTHER PUBLICATIONS

Machine Translation of JP2002004579 (Year: 2002).*

Office Action for Chinese Patent Application No. 202080017231.7, dated Jun. 1, 2022.

Office Action for Eurasian Patent Application No. 202191869, dated May 10, 2022.

International Search Report for PCT Patent Application No. PCT/EP2020/050046, mailed Apr. 8, 2020.

* cited by examiner

FLEXIBLE COMPOSITE

CROSS-REFERENCE TO RELATED APPLICATIONS

This application is the U.S. national stage application of International Application PCT/EP2020/050046, filed Jan. 2, 2020, which international application was published on Jul. 9, 2020, as International Publication WO 2020/141203 in the English language. The international application is incorporated herein by reference, in entirety. The international application claims priority to GB Patent Application No. 1900077.7 filed Jan. 3, 2019, which is incorporated herein by reference, in entirety.

The present invention relates to a flexible composite that can be set to become rigid on addition of a liquid or by exposure to gas or radiation, for example an aqueous media. In particular, the invention is directed towards a flexible composite material which can be used in the management and optimization of wells, including oil wells.

Oil-well production is a hugely costly process with costs fluctuating substantially on a daily basis. This means that optimizing the efficiency of a well is a key part of well design and development and there are several potential solutions available to increase well efficiency.

One approach to increase the efficiency of the well is zonal isolation. This is where sections of the well are segmented to draw a larger quantity of fluid by controlling the conditions in each zone created. To achieve this, a component called a swell packer is used. A swell packer is an elastomeric compound that is vulcanized to the outside of the down well pipe and is contained between two collars. The elastomeric compound is either oil or water activated, that is, when introduced to the appropriate fluid, expansion occurs forming a seal against the outer piping or rock wall, as illustrated in FIG. 1.

There are several problems which occur with systems of this type. Firstly, the elastomeric material degrades, often before the end of the lifetime of the well, causing failure of the isolation, which has the effect of reducing well capacity and efficiency during the well's lifetime. Degradation of the elastomeric material also results in pollution of the fluid stream. Pieces of elastomer can break off the swell packer and contaminate the fluid being produced or injected which can then cause downstream issues including blockages of equipment in the well or at the surface.

A failure rate of the elastomeric swell packers is accepted at up to 30% requiring more packers to be used to ensure isolation occurs and resulting in a high capital cost to try and guarantee the desired packing. Elastomeric swell packers also often exhibit poor swelling, sealing and durability in highly saline or alkaline environments. Given the location of many oil wells, these conditions are highly likely, and this is therefore a significant problem.

Elastomeric swell packers may lose their seal if the swelling media changes. For example, a packer that seals in an oil media may lose its seal if the media is changed to water at a later date, as the packer can shrink slightly as the water migrates out of the elastomer and cannot be replaced. The same disadvantage may be present for a water swelling packer exposed to oil. As a result, two different packers (separately oil and water activated) are usually required if the packers may be exposed to oil and water over time, this can double the number of packers required which again incurs a significant capital cost.

Further, elastomeric swell packers may be displaced within the casing by differential movement of the base pipe relative to the casing/bore hole. This can damage the sealing surfaces and often necessitates additional rock bolting to try to prevent movement. This is again an additional capital cost.

The net effect is that failures of the elastomeric swell packers result in increased capital costs and a lowered efficiency and production rate in the down-well system, which is the opposite of what is desired and required. The present invention aims to address these problems by the use of a flexible composite, in particular a cementitious system that can be attached to a pipe or casing in such a way as to have a sufficiently low profile to be lowered down a bare well bore or inside a casing. The system contains dry cementitious elements that, when exposed to water, highly saline, highly alkaline media and otherwise contaminated aqueous solutions, including drilling completion fluids, will absorb the fluid, expand and set to form a long-term cementitious seal between the production string and casing or bare rock. The set system can resist high differential pressures and high shear loads between the production string and outer casing or open hole.

According to the present invention there is provided an expandable porous formwork, said formwork containing a dry cementitious powder fill that, when exposed to an aqueous media, will expand against the constraint of the formwork and set to form a solid, hard and coherent material, the formwork being porous to liquids but substantially impermeable to the powder fill. Such a formwork can be used, by being attached to a pipe or casing, to optimize the efficiency of a well and overcome the problems of the prior art processes and products.

This new system, which may be called a Cementitious Swell Packer or CSP, has several advantages over the elastomeric type of swell packers discussed above. These advantages include:

- A long term down-well lifetime which exceeds the lifetime of the well—pre-mixed cement grouts are commonly used in the petrochemical industry in downhole applications for their high durability and long-life time;
- No contamination of the well fluid as the cement does not break down within the well's lifetime (as may happen with the elastomeric swell packers);

Once set, the cement is a permanent fixture for the lifetime of the well. This results in a lower failure rate during use;

- The cement formulation does not react with oil or degrade in a hydrocarbon atmosphere which is a significant improvement on the situation with the elastomeric swell packers;
- Improved performance in a high salinity environment. Many elastomeric swell packers will have a reduced swell or will have a reduced lifespan and performance when operating in high salinity or highly alkaline aqueous well fluids. Surprisingly the cementitious swell packer is able to achieve good swelling and mechanical performance when activated by highly saline fluids or alkaline fluids and is durable in such environments;
- Permanent sealing of the well pipe. Once hydrated and the reaction has been completed the cementitious swell packer will not shrink and surprisingly its permeability is decreased by exposure to oil, therefore one packer may be used to isolate a zone and, once set, it can be exposed to oil or water without a decrease in performance; and
- High mechanical performance. The solid cementitious material is able to resist very high shear loads, thereby reducing the requirement for rock bolting to prevent packers moving within the casing (as may be necessary with elastomeric packers) and thereby avoiding any damage that this causes to the sealing surfaces (pipe or rock).

These advantages and others will be discussed in more detail below, and in connection with specific embodiments of the system.

The formwork preferably has the cementitious powder fill able to expand to at least 125% of its initial volume on exposure to an aqueous media, for example to between 125 and 650% of its initial volume, or to between 125 and 450% of its initial volume, or to between 125 and 300% of its initial volume or to between 130 and 170% of its initial volume, for example to 150% of its initial volume. The powder blend has been developed to expand over time when exposed to an aqueous solution, whilst maintaining its structural integrity. The high expansion and the ability, when combined with the formwork, to remain as one, solid, hard and coherent material when set after swelling provides the desired properties to securely block or pack a well bore in applications such as zonal isolation. This has been achieved through the addition of various chemicals to the dry cementitious powder, each of which is discussed below with a description of the chemical role of the compounds.

The cementitious powder blend (CSP Blend) for use in the formwork of the present invention, in which the powder swells and sets on exposure to an aqueous medium, may comprise:

a. a calcium silicate based cementitious powder;
b. an alumina based cement containing or mixed with a calcium oxide component;
c. a calcium sulfate;
d. a superabsorbent polymer (SAP);
e. a metal oxide that is thermally stable above 120° C. and with an oxidation state of +1, +2, +3, +4, +5, +6 or +7.
f. a dense phase, insoluble sulfate compound; and
g. a retardant material which can be used to retard the initial setting of either component (a) or component (b) or magnesium-based cements.

Taking each component in turn, component (a) may be Ordinary Portland Cement (OPC) or any calcium silicate based cementitious powder including all grades of OPC and magnesium-based cements. It may be present in an amount of 30-54% by mass of the total cementitious powder, or in an amount of 30-40% by mass of the total cementitious powder, or in an amount of 32-38% by mass of the total cementitious powder. Optionally, the component may be selected to be 52.5 N or 52.5R CEM 1 available from Cemex™ in Rugby and may be used in an amount of between 32 and 38% by mass of the total cementitious powder.

Component (b) may be selected from any alumina-based cement containing or mixed with a calcium oxide component, for example a calcium aluminate cement, in particular Ciment Fondue (TM) from Imreys. This component improves the strength of the set material and forms the $C_3A$ phase high strength components of the set material. It may be present in an amount of from 0-25%, 10-20% or 13-16% by mass of the total cementitious powder.

Component (c) may be any form of calcium sulfate with the preferred form being the lower hydration analogue, such as the hemihydrate analogue. A suitable compound for use may be the hemihydrate analogue as may be purchased from Scientific Lab Supplies, made by Honeywell Fluka, at a grade of 97% purity. This may be present in the formulation at a level of 0-70%, or 20-40% or 28-35% by mass of the total cementitious powder.

Component (d) may be selected from any superabsorbent polymer (SAP) that increases site hydration throughout the material matrix, including cellulosic based SAPs, polyacrylnitrile type SAPs, polyvinylalcohol SAPs or polyethylene oxide SAPs or polyacrylic acid-based SAPs. In particular, polyacrylic acid-based SAPs, preferably the sodium salt analogue, sodium polyacrylate is used. This can be purchased from SNF (UK) Ltd. in Wakefield, UK. This may be added in the range of 0-10%, or 0.1-5%, or 0.1-0.5% by mass of the total cementitious powder.

Component (e) may be any synthetically or naturally produced metal oxide that is thermally stable above 120° C. and with an oxidation state of +1, +2, +3, +4, +5, +6 or +7, including ferrous oxides, titania and alumina. In particular, it may have an oxidation state of +2, +3 or +4 and may particularly be one of the ferrous oxides such as $Fe_3O_4$. This may be used in the range of from 0-30%, or 2-20%, or 5-15% by mass of the total cementitious powder.

Component (f) may be any dense phase such as an insoluble sulfate compound, for example an alkaline earth metal such as barium sulfate. A suitable barium sulfate material may be purchased from Scientific Lab Supplies™, of Nottingham at a 99% grade purity. The sulfate compound increases the physical density of the cement complex, stabilizing the cement compounds. Barium sulfate surprisingly has the additional advantage that it also produces a synergistic effect with completion fluids that also contain barium sulfate. The synergistic effect is produced by having two similar components across an interface barrier, in this case, the completion fluid to cementitious CSP, this increases the osmotic effect on the water component of the emulsion created in the completion fluid causing it to migrate more readily into the cementitious CSP increasing the expansion potential. This component may be present in the range of from 0-30%, or 2-15%, or 5-10% by mass of the total cementitious powder.

Component (g) may be any material that can be used to retard the initial setting of OPC or other calcium-silicate based cements, high alumina cements or magnesium-based cements including natural and synthetic sugars, carboxylic acids, citric acids and their salt analogues or aminopolycarboxylic acids. An example of a suitable material is aminopolycarboxylic acids, such as ethylenediaminetetraacetic acid as may be purchased from Sigma Aldrich in Damstadt, Germany at a 99.997% grade purity. These may be present in an amount of from 0-10%, or 0.1-5%, or 0.1-2% by mass of the total cementitious powder.

In an alternative embodiment retarders and accelerants are selected such that they decompose at specific elevated temperatures and/or pressure combinations. This has the further advantage of preventing the CSP from swelling significantly until it has been lowered to the correct zone in the well, whereupon the retarder begins to decompose and hence the reaction is no longer retarded and proceeds at an increased rate. Retarders may also be selected to react with additives that can be introduced and pumped into the fluid in the well in order to decompose, displace or react with the retarder in order to trigger the swelling setting reaction at a chosen time. Accelerants may also be added to the well fluid after the CSP has been installed in the well to cause the powder to swell and set at a chosen time.

The invention also extends to a formwork, in which the cementitious powder fill has the following composition:

i. Any CEMI, CEMII, CEMIII, CEMIV or CEMV type cement that is dosed between 10-90% by mass of the CSP Blend as described above; or ii. Any high alumina cement that is dosed between 10-90% by mass of the CSP Blend as described above; or iii. Anhydrous, hemi-hydrate or di-hydrate $CaSO_4$ that is dosed between 20-80% by mass of the CSP Blend as described above; or iv. Ethylenediamine tetra-acetic acid that is dosed between 0.01-10% by mass of the CSP Blend as described above; or v. Any superabsorbent polymer that is dosed between 0.01-10% by mass of the CSP Blend as described above; or vi. Any one of FeO, $Fe_2O_3$ or $Fe_3O_4$ that is dosed between 1-30% by mass of the CSP Blend as described above; or vii. Barium Sulfate that is dosed between 1-30% by mass of the CSP Blend as described above.

Other optional and preferred features are set out in the accompanying claims. Advantages of these features may be set out in the detailed description below.

The present invention may be described by reference to the following figures, in which.

The CSP consists in essence of a 2-component system and securing end caps. The first component is a dry cementitious powder blend that when exposed to an aqueous media will expand and set to form a solid hard and coherent material (the Powder) and the second component is an expandable porous formwork that contains the swelling cementitious powder blend (the Formwork). The end caps (the End Caps) are used to retain the formwork and powder in place until they are in location and are set and increase the shear resistance once set. The end caps may be pre-formed as part of the casing or pipe string or its connectors, for example by machining a seat to support an unset swelling element such as a toroid, or by forming an end cap that is also part of a pipe or connector.

Figure 1:
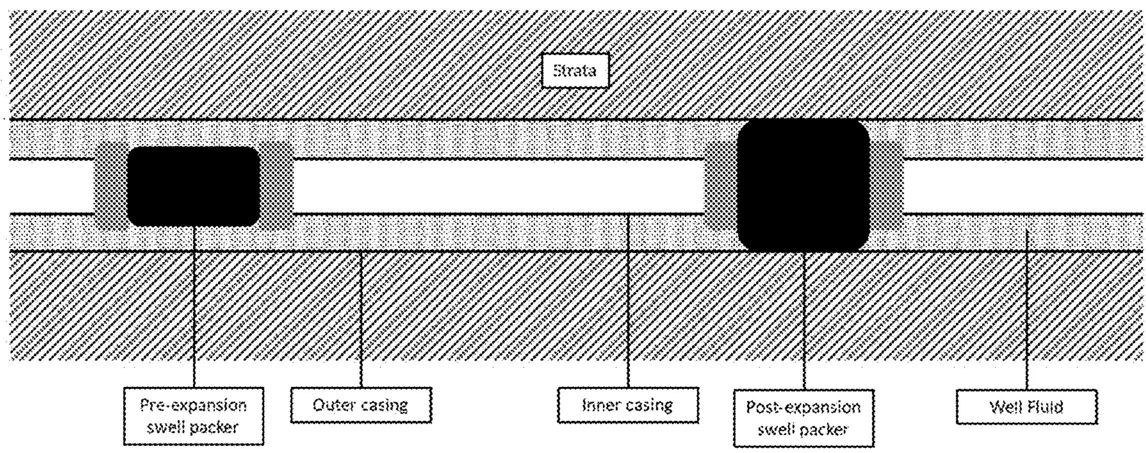
FIG. 1 shows, schematically, a prior art method of creating zonal isolation using elastomeric swell packers.
Figure 2:
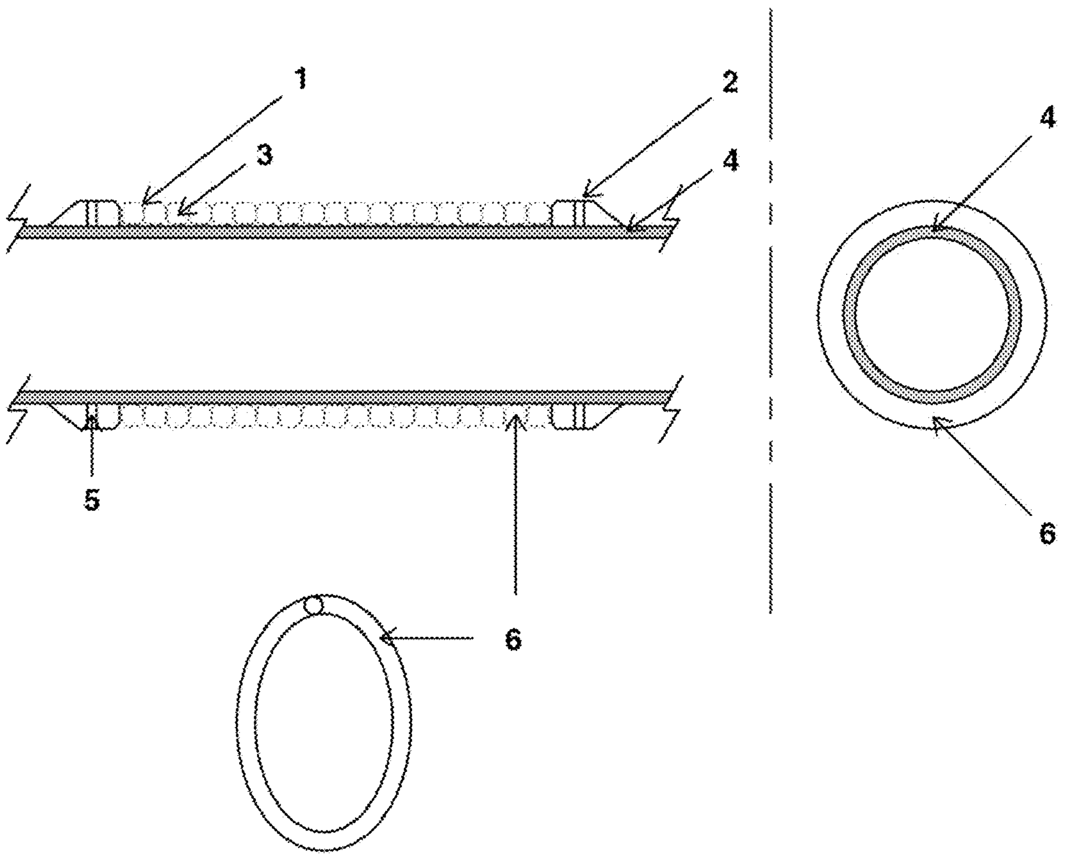
FIG. 2 shows, schematically, an example of the system of the present invention.

Referring to FIG. 2, each formwork (1) is filled with a controlled mass of the dry powder (3) at a controlled density and is assembled onto the outside of a pipe (4), for example in a well bore. The outer surface of the pipe may be roughened or prepared in a number of ways to improve the adhesion of the set cement to the pipe and to increase the shear load and achievable pressure differential across the CSP. Suitable methods of roughening or preparing the pipe include but are not limited to: degreasing, sand blasting, polishing, knurling and machining. The end caps (2) are then attached to the pipe and secured using either a mechanical attachment (5) such as a grub screw, or an adhesive method (not shown) or a combination of both.

The formwork (1) contains the dry cementitious powder and is preferably an expandable formwork that maintains the packing density of the dry cement powder blend and holds it in the correct position during storage, transport and installation. The formwork prevents the CSP from contacting the sides of the well hole and from being damaged or becoming stuck as the CSP is lowered into position. Centralizers below and/or above the CSP may also be used to ensure the CSP's end caps do not contact the sides of the pipe and the CSP is preferably centralized in the casing/bore hole before it expands. The formwork is preferably prepared in the form of a torus (6) with the outer diameter of the base pipe corresponding to the same or larger than the inner diameter of the torus. This torus is then deformed when assembled onto the pipe to obtain a ring around the base pipe with an approximately rectangular cross section. The assembly is shown schematically in FIG. 2. Other configurations of the assembled formwork are possible which include two surfaces connected by linking elements to form a sleeve around the base pipe, multiple rings or tubes that are connected together to give the equivalent of multiple connected or discrete torus rings joined together or multiple long tubes that are wound around the base pipe in one or more spirals.

When the CSP is lowered into a well hole it will be exposed to the liquid media contained within the well hole. The formwork is permeable to fluids but substantially impermeable to both the dry powder and hydrated powder contained within it, thus allowing the fluid to be absorbed by and to react with the dry powder but preventing the dry powder or hydrated expanding powder from escaping the confining effect of the formwork.

Figure 3:
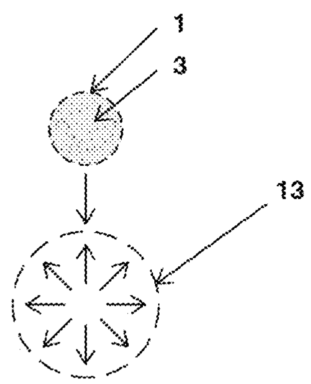
FIG. 3 shows an example of the present invention in use in a well bore.
Figure 3:
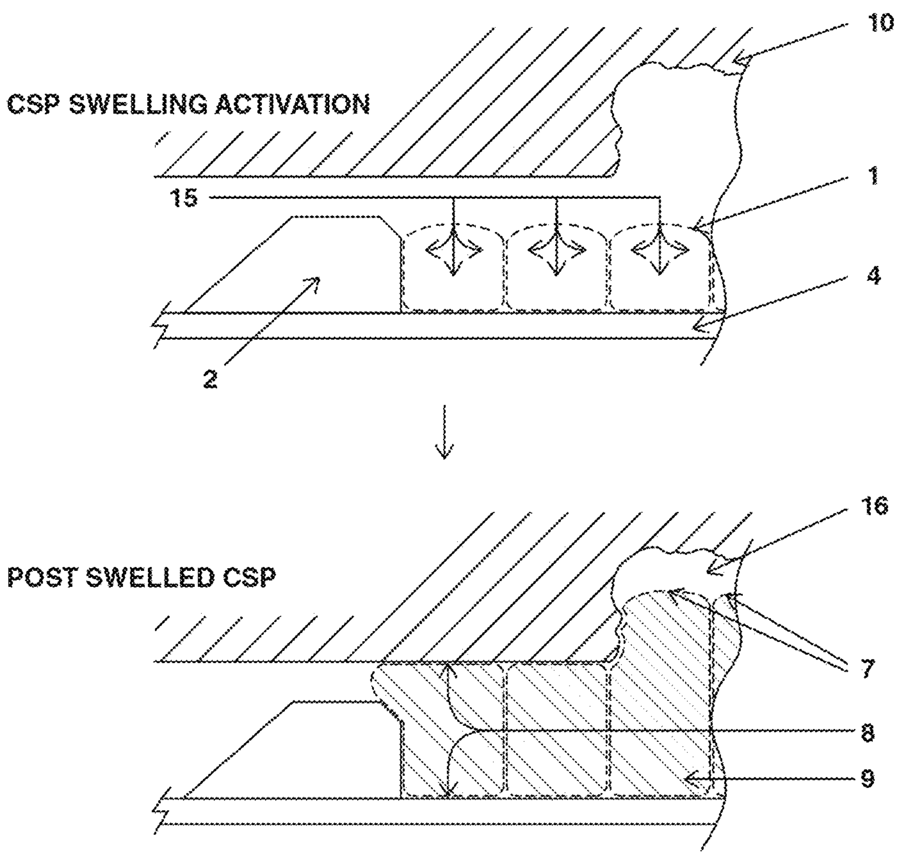

As shown in FIG. 3, when the aqueous fluid (15) contacts the dry powder (3) in the formwork (1), a reaction begins causing the powder to expand (13). As it expands the reaction will progress further as the aqueous media is consumed and drawn through the formwork (1) and into the powder (as shown by the arrows in the CSP swelling activation figure in FIG. 3). The formwork walls are able to expand elastically and/or plastically in one or more directions to at least 110% of its initial length on exposure to an aqueous media, for example to between 110 and 650% of its initial length, or to between 110 and 450% of its initial length, or to between 110 and 250% of its initial length, or to between 110 and 140% of its initial length, for example to 125% of its initial length. As the powder expands strain and the tension in the walls of the formwork increases (13) and this allows the formwork to exert an increasing confinement pressure on the swelling powder. The confinement pressure prevents the powder from losing its compaction during the swelling phase and hence controls the water to cement ratio. Without the confinement of the formwork the powder would become dispersed and would no longer be able to set or, if the formwork did not exert a confining pressure during swelling, the swelling cement blend would expand too rapidly and produce a cracked and weak final structure that would be prone to forming an incoherent structure, and thus would break apart.

The hydrated powder expands and sets to form a set expanded cementitious material (9) over a period of between 0.1 and 28 days, or more preferably between 0.5 and 15 days, or more preferably between 3 and 10 days. This can be adjusted to achieve a desired swelling and setting time in a given temperature, pressure and chemical environment by adjusting the proportions of the formulation, in particular the properties of the retarder and its decomposition profile in an elevated temperature and pressure atmosphere. As the powder continues to swell the confinement pressure of the stretched formwork increases due to the increased strain in the walls of the formwork, this will continue until, one of two states are reached. Either the formwork contacts a barrier such as the inside of the outer casing pipe or the rocky internal face of the bore hole, whereupon it will then key to the shape of the interface and apply the swelling pressure to this interface to form a seal (8). Alternatively, the confinement pressure exerted by the formwork increases with the increased tensile strain in the formwork walls and the pressure exerted by the expanding cementitious material decreases with the percentage increase in volume such that these two opposing pressures will reach an equilibrium if the formwork does not contact a solid barrier (7). This would occur in the case of a void (16) adjacent to the CSP.

Once the cementitious material and formwork has expanded as in either of the two scenarios discussed above, it will solidify to form a durable cementitious plug. In the case of the first scenario it will be exerting a pressure both on the internal pipe (4) and external pipe or rock (10) and will form a seal to these two interfaces (8). The pressure exerted by the expanded cementitious material on the inner pipe and the outer casing pipe/bore hole creates a bond that enables it to resist large shear loads as well as differential pressures once fully set, as shown in FIG. 3—post swelled CSP.

In testing a prototype device of dimensions: CSP Outer Diameter 284 mm, length 304 mm and consisting of 14 torus shaped formwork rings installed on a steel base pipe having outer diameter 244 mm, was inserted into a steel pipe of inner diameter 315 mm that had been filled with a saturated solution of sodium chloride in water, the CSP expanded to form a seal within 7 days and after 14 days resisted an axial pull load exceeding 19 Tonnes.

The formwork is preferably in the shape of a ring torus and is engineered to be much stiffer in the toroidal direction than the poloidal direction, this has the effect of directing the swelling of the powder blend radially outwards from the centre of the base pipe. This anisotropic stiffness can be accomplished in a number of ways including by knitting the formwork using double needle bar warp knitting such that elastomeric yarns, such as elastic run in the poloidal direction and stiffer yarns such as multifilament polyester yarns run in the toroidal direction of the major circumference. The formwork may also be made by other suitable methods known in the art, such as: weft knitting; circular warp knitting, also known as knit braiding; braiding; weaving; folding and sealing or seaming flat fabric—with a straight seam along one edge or both edges; folding and sealing or seaming flat fabric—with a spiral wrap shape (in a similar way to that which can be seen in cardboard cores); an extruded tube; a 3D printed tube; or by extruding, injection moulding, vacuum forming, rotationally moulding a polymer tube or toroid form, with holes in it that has optionally been stiffened by forming thicker elements in the toroidal direction or inserting stiffer composite elements in the toroidal direction.

In some embodiments, multiple torus rings may be installed next to each other between the end caps. Each ring reduces the leak rate of the entire set CSP when exposed to a differential pressure and increases the maximum differential pressure the CSP can withstand for a given leak rate (which may be close to or equal to 0 m/s) and thereby increases the maximum shear load the CSP can resist. Multiple torus rings can also be used to create redundancy: should any of the rings fail to expand and seal correctly for any reason or become damaged other rings will ensure that the CSP still forms a seal. This will be at considerably less than the 30% failure rate which is accepted in the prior art and immediately provides evidence of a significant material cost advantage over the prior art process.

In an alternative configuration, multiple torus rings are used with different formwork and/or powder fill selected and may be arranged in groups of one or multiple rings to have different properties along the length of the CSP. These variations can include resistance to one or more chemicals which may be present in the environment, different responses to liquid media during setting, varied responses to a range of temperature and pressure environments, alternative responses to activation events for example a spike in temperature and different expansion rates and setting times. By way of example, the first 1 to 10 rings might be configured to have a higher resistance to acid attack and the second ten to resist a highly alkaline environment. This configuration may or may not be installed in a symmetric configuration along the length of the CSP, or they could be arranged in grouped zones or any other pattern, torus rings with different properties may be used in any configuration along the length of the CSP.

The formwork can be made from any suitable material such that it contains the dry cementitious powder, is porous to liquids, is substantially impermeable to the powder and is expandable. Suitable materials include, but are not limited to:

- elastomeric yarns including covered elastomeric yarns where a cover yarn is wrapped around the elastomeric yarn, cover yarns include polyester and nylon
- general polymeric yarns such as polyester, polyamide, polypropylene, or polyethylene
- natural yarns, such as cotton, wool, bamboo, ramie, rayon, wool, or acetate
- high performance yarns such as aramid, ultra high molecular weight polyethylene (UHMWPE (such as dyneema™), para-aramid, or polyetheretherketone (PEEK)
- dissolving yarns, such as polylactic acid (PLA), poly (I-lactic acid) (PLLA)
- metal yarns, glass fibre, basalt
- Polymers including: Low-density polyethylene (LDPE), High-density polyethylene (HDPE), Polypropylene (PP), Polyvinyl chloride (PVC), Polystyrene (PS), Nylon, nylon 6 or nylon 6,6, Thermoplastic polyurethanes (TPU), Polytetrafluoroethylene
- Chopped fibres in non-woven materials such as needle punch non-wovens, malifleece non-wovens and felts.

In an embodiment, the powder fill may be dosed with different levels or types of a retarder or accelerator to delay or accelerate respectively the expansion and setting of one or more torus rings or groups of rings. For example, the central rings may be designed to expand before the rings closest to the end caps to ensure that the central rings have access to sufficient well fluid to reach their maximum expansion and strength before the outer rings expand fully and seal them off from the well fluid.

Depending on the fabrication and filling method the filled torus rings will have joints or discontinuities. If they are present, they are preferably arranged so that the discontinuity is not in contact with the surface of the base pipe or facing outwards from the base pipe towards the outer casing pipe or bore hole such that the discontinuity will not form part of the sealing surface. This could form a point of weakness if the discontinuity did touch the wall. Additionally, particularly if the discontinuity is around the entire minor circumference of the torus then the torus rings should be installed on the base pipe in a way such that each discontinuity is offset relative to the discontinuity on the adjacent torus. This will again avoid the risk of a significant point of weakness being introduced to the system.

In some circumstances it is advantageous for one or more of the CSP's to be lowered into a well on a string and then the swelling or setting reaction triggered at a later point in time. The advantages of a triggered solution include being able to withdraw the CSP's prior to triggering the swelling or setting reaction if any problems develop, being able to ensure the CSP has reached the intended location in order to avoid the risk of a CSP swelling before it is in the correct location and there is also the opportunity to trigger CSP's a considerable time after insertion in order to segregate a section of the well at a later date for operational reasons.

To achieve this, the formwork can be configured to include one or more electrically resistive elements such that a current can be passed through the formwork causing it to heat up. This heating effect can be used to initiate the swelling and setting reaction at a chosen time by decomposing a retarder as described previously or by reducing the stiffness or increasing the porosity of the formwork by melting certain restraining or sealing elements.

Alternatively, or in addition, the porous formwork may be temporarily sealed by a wax or polymer coating with a specific melting point (taking account of both temperature and pressure conditions in the environment of use) such that it will cease to seal the formwork at a predetermined location on a temperature pressure map of the well that will correspond with known conditions at a specified depth of the well in which it is installed. This will then allow the well fluid to contact the powder and initiate the swelling and setting reaction once it is close to the selected location. This can be tuned such that the wax or polymer coating may melt once the formwork is within a specified distance of the selected location, for example within 500 m, 400 m, 300 m, 200 m or 100 m of a pre-determined location in the well.

Materials which may be used for the temporary sealing include, but are not limited to low-density polyethylene (LDPE); high-density polyethylene (HDPE); polypropylene (PP); polyvinyl chloride (PVC); polystyrene (PS); nylon, nylon 6, or nylon 6,6; thermoplastic polyurethanes (TPU); natural polymers such as starch based polymers; and natural and synthetic elastomers.

Alternatively, or in addition, the porous formwork may be sealed by a wax or polymer with a specific rate of degradation in a specific chemical environment at a specific pressure and temperature in order to allow the well fluid to contact the powder and initiate the swelling and setting reaction at a time after it has contacted the specific chemical environment. Once it is decided to initiate the swelling reaction, or the relevant conditions have been reached with the deployment of the formwork, the well pressure can be increased by pumping to increase the pressure above the hydrostatic pressure at the depth of the CSP's in order to cause the sealant to break down rapidly and allow the well fluids to contact the powder and initiate the swelling and setting reaction. Furthermore, as the CSP's may be installed at different depths they can be initiated individually in order of depth (deepest first) by controlling the over pressure applied at the surface within calculated limits as the lowest un-triggered CSP will see the over pressure plus the greatest hydrostatic pressure. This is a useful way of controlling the deployment of the formworks at different locations within an existing well bore and then shutting different areas off as they are emptied of oil, to then optimize the performance of the remaining areas.

By way of specific example, the pores in a knitted formwork may be sealed with a wax or polymer coating. An organically modified clay with oligomeric styrene units bonded between the layers of the clay can be bonded to the coating or dosed into the well fluid. The clay increases the thermal stability of the oligomeric surfactant, such that this structure can be tuned to release the oligomeric surfactant above a specified temperature and pressure. The oligomeric surfactant, once released, will cause the wax or polymer layer to degrade rapidly and once degraded the well fluid will contact the powder causing the CSP to swell, set and isolate a zone.

Alternatively, the pores may be sealed with a wax or polymer coating. At a later time, the coating may be degraded by dosing a chemical into the well fluid and circulating it in order to cause the sealant to break down rapidly and allow the well fluids to contact the powder and initiate the swelling and setting reaction. Suitable polymers for the coating include, but are not limited to: low-density polyethylene (LDPE); high-density polyethylene (HDPE); polypropylene (PP); polyvinyl chloride (PVC); polystyrene (PS); nylon, nylon 6, or nylon 6,6; thermoplastic polyurethanes (TPU); natural polymers such as starch based polymers; and natural and synthetic elastomers.

Suitable chemicals that could be dosed and circulated to break down the coating include, but are not limited to: hydrophilic surfactants; and acids including hydrochloric acid and sulfuric acid.

Figure 4:
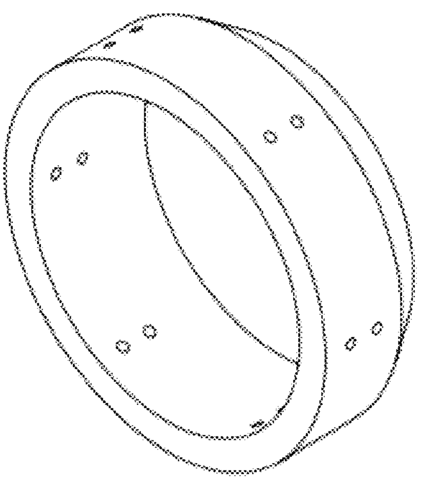
FIG. 4 shows one embodiment of an end cap which can be used in the present invention.

The End Caps used in the system, as shown in FIG. 4, may be mechanically attached to the base pipe using a variety of conventional attachment methods. Such methods include, but are not limited to, a threaded attachment and grub screws, or by means of a suitable adhesive. The End Caps serve several functions. They prevent the torus rings from moving along the pipe during storage, transport and installation. They protect the casing as the CSP is lowered into position within the well casing pipe or bare hole. They can increase the shear load resistance of the set CSP by reducing the effective depth of set cement loaded in shear and increasing the maximum shear load between the inner seal of the casing and the pipe on which the CSP is installed. Intermediate end caps may therefore also be installed part way along the length of the CSP (particularly if it is long) to increase the load capacity, to increase the level of protection or to separate zones of torus rings with different properties.

This can be particularly beneficial for long CSP's where different properties may be desirable for the changing physical and chemical environments which may be encountered over the lifetime of the system. The end caps can be made from any standard engineering materials including steel. Typically, a steel will be selected that is compatible with the steel used for the casing string and typical grades would therefore be L80, P110 or for corrosive environments stainless steels may be used such as Monel 400, K500, 600 or 700. The corner of the end cap in contact with the formwork will be chamfered or rounded to avoid damaging the formwork as it swells against the end cap.

The configuration of the formwork and the end caps ensures that, as the material swells, the direction of swelling and hence movement of the outer surface of the casing is controlled and directed substantially radially outwards towards the surface which the CSP is intended to seal to (the inner surface of a pipe/well bore).

EXAMPLE

An embodiment of the present invention consists of a steel pipe of the same dimensions as those used in a production string for oil extraction, in this case being a pipe with outer diameter of 244 mm and 2.438 m long.

A textured polyester was knitted in a “chain stitch” (sometimes called “pillar stitch”) patterns along the length of the fabric to achieve minimal stretch in the length of the fabric tube (0-1/1-0). An elastomeric yarn was inlayed between the chain stitches to connect the chain stitches together to create the fabric and to allow expansion in the hoop direction of the fabric tube (0-0/3-3).

42 Tubes, each of length 83 cm were knitted. The tubes were then each filled with approximately 0.35 kg of powder that has been thoroughly blended together in the following proportions (by mass) 36.8% ordinary Portland cement 52.5N, 15.5% Ternal White, 29.4% anhydrous calcium sulfate, 0.5% ethylenediaminetetraacetic acid, 0.3% super-absorbent polymer, 10% synthetic $Fe_3O_4$, and 7.5% barium sulfate. The ends of each tubes were then hand sewn together to form a torus using a looping stitch to create a smooth joint that can expand preferentially in the poloidal direction. The powder was then redistributed and consolidated by placing each filled torus into a two-part torus shaped mould and vibrating it for over 5 minutes. The mould was opened, and the torus repositioned six times during the process to enable an even distribution of the powder to be obtained within the formwork. This process was repeated to produce 42 torus rings.

Two steel end caps (as shown in FIG. 4) were fabricated. One end cap was attached to the base pipe using grub screws, the 42 tori were then assembled onto the base pipe and compacted together, a second end cap was then fixed to the base pipe using grub screws. A minimum quantity of silicon adhesive was also used to glue the filled torus rings to the base pipe to prevent further movement. The filled CSP was then rolled on a flat surface to compress the torus rings together to form a rectangular cross section tube (rather than one made up of multiple small circles) that encased the base pipe and was approximately 18 mm deep being 2 mm lower than the depth of the end caps. The completed CSP was then wrapped and sealed in a plastic film for storage.

One week later the plastic film was removed and the CSP was lowered into a steel pipe with an internal diameter of 315 mm that was filled with water saturated with sodium chloride. The powder filled tori were observed to swell over a 7-day period to give a water tight seal and after 14 days a 30 cm length of the CSP was cut off, this section resisted a pull force of 19 T. Sections of the outer pipe were cut off to show that the powder filled tori had expanded and sealed against it.

Other Applications

The system has been discussed in the context of oil well pipes so far, but there are several other applications for the technology and for the use of the swelling powder filled formwork. This applies for a number of sealing and shear load resisting applications. The non-limiting list of applications includes the following uses.

External protection of pipe joints, in particular welded joints for large steel pipelines. The formwork is prepared as a number of toroidal elements that may be linked together. These elements are pushed onto the end of one of the pipes to be joined so that they sit on the outside of the pipe. Once the pipe ends have been welded together the elements are pushed along the pipe to cover the welded joint. The formwork is then hydrated by spraying or immersion in water or an aqueous media. This causes the formwork to swell and set creating a concrete shield that protects the weld. Because the powder filled formwork swells prior to setting it will seal to the pipe and protect it from: mechanical damage and corrosion, because of the alkaline nature of the cement blend it will also inhibit the corrosion of steel pipes through passivation.

Figure 5:
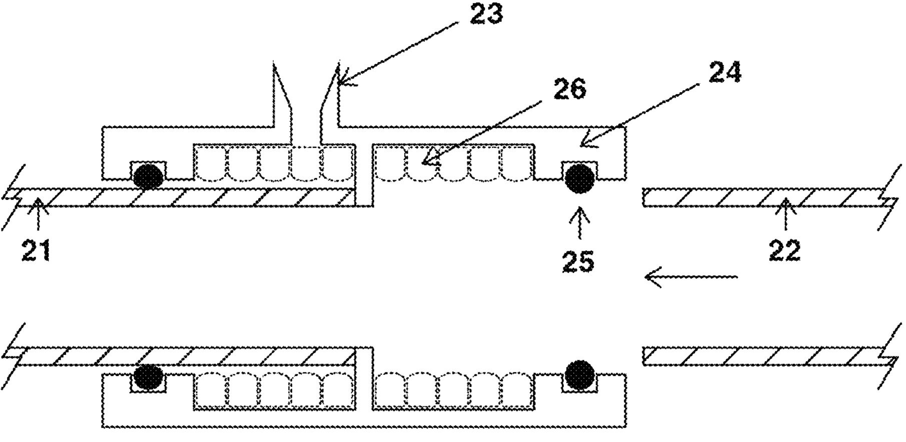
FIG. 5 shows an example of the present invention being used for jointing pipes together.

Jointing of pipes. As shown in FIG. 5, the formwork is installed on the inside of a pipe such that the Cut Pipe (21) is inserted into the device. The second Cut Pipe (22) to be joined to the first cut pipe (21) is inserted at the other end of the device. A fill port and reservoir (23) for hydrating the powder filled formwork (26) is located on top of the device and this is supplied with an aqueous media until the reservoir is filled. The powder filled formwork (torus shaped) is arranged circumferentially around the pipes to be joined. The reservoir is bounded by a hard casing (24) which retains the liquid in place while the powder sets, the casing includes an internal stop to prevent over insertion of the pipe this stop includes holes to permit the passage of the aqueous media between the two halves. The device may additionally include optional Elastomeric O-ring seals (25) at each end of the device and at the junction of the two pipes (not shown) to assist in retaining the aqueous media until the powder filled formwork has expanded and set.

The present invention could also be used for the sealing of significant sized crack. In an example, a linear formwork, for example a cylinder closed at both ends, may be inserted into a crack and then activated by an aqueous medium such that it expands to fill the crack and sets and seals the crack.

The invention can also be used to seal pipe penetrations in tanks and bunded areas—in this case the powder filled formwork is slid over the pipe and the pipe inserted through a hole or in the case of a concrete bund the concrete is poured around the pipe and powder filled formwork. The formwork is then sprayed with an aqueous media and expands against the tank/bund wall before setting to create a durable sealed interface.

The invention can also be applied in the form of a large pillow or tubular shaped formwork filled with the powder which can be used to temporarily patch holes in ships. Large powder filled forms weighing up to 30 kg could be used to pack a breach in a ships hull, they would then expand when exposed to water from the outside and set to partly or wholly seal the breach in the hull. This is a quick and effective solution to a problem if the ship is holed at sea and needs to secure the breach in the hull and return to port for a permanent repair.

The invention can also be used for pipe sealing or to plug disused oil wells or sections of well whereby a tubular formwork filled with the powder where both ends are closed can be inserted into a pipe with a larger internal diameter than the outer diameter of the formwork and the powder filled formwork will swell on contact with the aqueous media in the pipe or bare well to plug the pipe/well. Alternatively, a CSP can as described previously can be assembled on a solid core instead of a base pipe for example a concrete core, the CSP will then expand to full close off a pipe or hole. This is an alternative way to close off a pipe.

The invention claimed is:

1. An expandable porous formwork, said formwork containing a dry cementitious powder fill that, when exposed to an aqueous media, will expand against the constraint of the formwork and set to form a solid, hard and coherent material, the formwork being porous to liquids but substantially impermeable to the cementitious powder fill, and in which the formwork comprises multiple torus rings arranged in groups of one or multiple of the multiple torus rings, a first group of the groups having different formwork and/or dry cementitious powder fill from a second group of the groups thereby providing different properties along the length of the formwork, the different properties selected from one or more of: resistance to one or more chemicals, response to liquid media during setting, response to a range of temperature and pressure environments, response to activation events, expansion rates, and setting times.

2. A formwork as claimed in claim 1, in which the cementitious powder fill expands to at least 125% of its initial volume on exposure to an aqueous media.

3. A formwork as claimed in claim 2, in which the cementitious powder fill expands to between 125 and 650% of its initial volume on exposure to an aqueous media, or to between 125 and 450% of its initial volume, or to between 125 and 300% of its initial volume, or to between 130 and 170% of its initial volume.

4. A formwork as claimed in claim 1, in which the formwork is arranged to exert a confinement pressure on the cementitious powder fill such that, as the cementitious powder fill expands, the formwork exerts an increasing confinement pressure on the cementitious powder fill with an increasing degree of expansion.

5. A formwork as claimed in claim 1, in which the formwork and the expanded and set powder fill form a seal, once set.

6. A formwork as claimed in claim 1, wherein the toroidal shape comprises a rectangular or square cross section with radiused corners.

7. A formwork as claimed in claim 1, in which the formwork is engineered to be much stiffer in the toroidal direction than the poloidal direction.

8. A formwork as claimed in claim 7, in which the formwork has been formed by knitting using double needle bar warp knitting such that elastomeric yarns run in the poloidal direction and stiffer yarns such as multifilament polyester yarns run in the toroidal direction of the major circumference.

9. A formwork as claimed in claim 7, in which the formwork is made by one of the following processes: weft knitting; circular warp knitting; braiding; weaving; folding and sealing or seaming a flat fabric such that there is a straight seam along one edge or both edges; folding and sealing or seaming a flat fabric in a spiral wrap shape; an extruded tube; a 3D printed tube; or by extruding, injection moulding, vacuum forming or rotationally moulding a polymer tube or toroid form.

10. A formwork assembly further comprising:

a pipe; and an expandable porous formwork as claimed in claim 1, assembled on to the pipe.

11. The formwork assembly as claimed in claim 10 further comprising end caps at each end of the assembly.

12. The formwork as claimed in claim 1, in which the cementitious powder fill of each of the torus rings or each group of rings has been dosed with different levels or types of a retarder or accelerator to delay or accelerate the expansion.

13. A formwork as claimed in claim 1, which further includes electrically resistive elements.

14. A formwork as claimed in claim 1, in which the formwork is tubular in shape and consists of an inner and outer surface connected by elastically or plastically deformable linking elements, the outer surface being elastically or plastically deformable and being permeable to aqueous media but being substantially impermeable to the cementitious powder fill.

15. A formwork as claimed in claim 1, wherein the dry cementitious powder fill comprises a cementitious powder blend (CSP Blend) which swells and sets on exposure to an aqueous medium and which has the following composition:

a. a calcium silicate based cementitious powder;

b. an alumina-based cement containing or mixed with a calcium oxide component;

c. a calcium sulfate;

d. a superabsorbent polymer (SAP);

e. a metal oxide that is thermally stable above 120° C.

f. a dense phase, insoluble sulfate compound; and g. a retardant material which can be used to retard the initial setting of the cement, including component (a) and/or component (b).

16. A formwork as claimed in claim 15, in which at least one of:

component (a) is present in an amount of 30-54% by mass of the total cementitious powder blend;

component (b) is present in an amount of 0-25% by mass of the total cementitious powder blend;

component (c) is present in an amount of 0-70% by mass of the total cementitious powder blend;

component (d) is present in an amount of 0-10% by mass of the total cementitious powder blend;

component (e) is present in an amount of 0-30% by mass of the total cementitious powder blend;

component (f) is present in an amount of 0-30% by mass of the total cementitious powder blend; or component (g) is present in an amount of 0-10% by mass of the total cementitious powder blend.

17. A formwork as claimed in claim 15, in which at least one of:

component (a) is selected from all grades of Ordinary Portland Cement and magnesia-based cements;

component (b) is selected from a calcium aluminate cement;

component (c) is selected from a lower hydration analogue of calcium sulfate;

component (d) is selected from cellulosic based SAPs, polyacrylnitrile type SAPs, polyvinylalcohol SAPs, polyethylene oxide SAPs or polyacrylic acid-based SAPs;

component (e) is a metal oxide that is thermally stable above 120° C. and with an oxidation state of +2, +3 or +4;

component (f) is selected from alkaline earth metal sulfates; or component (g) is a retardant material which is used to retard initial setting of component (a) or component (b) or a magnesium-based cement.

18. A formwork as claimed in claim 15, in which the SAP is a polyacrylic acid-based SAP.

19. A formwork as claimed in claim 15, in which component (e) is selected from ferrous oxides, titania and alumina.

20. A formwork as claimed in claim 15, in which component (g) is selected from natural and synthetic sugars, carboxylic acids, citric acids and their salt analogues or aminopolycarboxylic acids.

21. A formwork as claimed in claim 20, in which component (g) is an aminopolycarboxylic acid.

22. A formwork as claimed in claim 1, in which the cementitious powder fill has the following composition:

i. Any CEMI, CEMII, CEMIII, CEMIV or CEMV type cement that is dosed between 10-90% by mass of the CSP Blend as claimed in any one of claims 15 to 21;

ii. Any high alumina cement that is dosed between 10-90% by mass of the CSP Blend as claimed in any one of claims 15 to 21;

iii. Anhydrous, hemi-hydrate or di-hydrate $CaSO_4$ that is dosed between 20-80% by mass of the CSP Blend as claimed in any one of claims 15 to 21;

iv. Ethylenediamine tetra-acetic acid that is dosed between 0.01-10% by mass of the CSP Blend as claimed in any one of claims 15 to 21;

v. Any superabsorbent polymer that is dosed between 0.01-10% by mass of the CSP Blend as claimed in any one of claims 15 to 21;

vi. Any one of FeO, $Fe_2O_3$ or $Fe_3O_4$ that is dosed between 1-30% by mass of the CSP Blend as claimed in any one of claims 15 to 21; or vii. Barium Sulfate that is dosed between 1-30% by mass of the CSP Blend as claimed in any one of claims 15 to 21.

23. An expandable porous formwork as claimed in claim 1, in which the formwork is made from dissolving yarns of polylactic acid (PLA) or poly (1-lactic acid) (PLLA).

24. The formwork of claim 1, wherein each torus ring of the multiple torus rings has a toroidal shape comprising a rectangular or square cross section with radiused corners, wherein adjacent torus rings of the multiple torus rings form a rectangular cross section tube.

25. The expandable porous formwork as claimed in claim 12, wherein the torus rings are arranged into groups of rings such that a central group of rings expand before rings closest to the end caps are activated.

26. An expandable porous formwork, said formwork being configured to attach to a pipe to be lowered into a casing or bore hole, said formwork being made from dissolving yarns and containing a dry cementitious powder fill that, when exposed to an aqueous media, will expand against the constraint of the formwork and set to form a solid, hard and coherent material, wherein when the formwork is attached to a pipe and lowered into a casing or bore hole, the expansion is configured to form a cementitious seal between the pipe and the casing or between the pipe and the bore hole, the formwork being porous to liquids but substantially impermeable to the cementitious powder fill, and in which the formwork is toroidal in shape.

27. An expandable porous formwork, said formwork being configured to attach to a casing to be lowered into a bore hole, said formwork being made from dissolving yarns and containing a dry cementitious powder fill that, when exposed to an aqueous media, will expand against the constraint of the formwork and set to form a solid, hard and coherent material, wherein when the formwork is attached to a casing and lowered into a bore hole, the expansion is configured to form a cementitious seal between the casing and bore hole, the formwork being porous to liquids but substantially impermeable to the cementitious powder fill, and in which the formwork is toroidal in shape.

28. The expandable porous formwork of claim 26, wherein the dissolving yarns are at least one of polylactic acid (PLA) and poly (1-lactic acid) (PLLA).

29. The expandable porous formwork of claim 27, wherein the dissolving yarns are at least one of polylactic acid (PLA) and poly (1-lactic acid) (PLLA).

* * * * *